(12) United States Patent
Kang et al.

(10) Patent No.: US 11,102,116 B2
(45) Date of Patent: *Aug. 24, 2021

(54) METHOD AND DEVICE FOR HOSTING APPLICATION BY ACCESS NODE

(71) Applicant: Samsung Electronics Co., Ltd., Suwon-si (KR)

(72) Inventors: Seong-Ryong Kang, Seongnam-si (KR); Jong-Hyune Kim, Seoul (KR); Dong-Jo Cheong, Yongin-si (KR); Ki-Ho Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/788,787

(22) Filed: Feb. 12, 2020

(65) Prior Publication Data

US 2020/0186467 A1 Jun. 11, 2020

Related U.S. Application Data

(63) Continuation of application No. 14/441,356, filed as application No. PCT/KR2013/010076 on Nov. 7, 2013, now Pat. No. 10,601,709.

(30) Foreign Application Priority Data

Nov. 8, 2012 (KR) .................. 10-2012-0126013

(51) Int. Cl.
*H04W 4/00* (2018.01)
*H04W 4/60* (2018.01)
(Continued)

(52) U.S. Cl.
CPC .......... *H04L 45/74* (2013.01); *H04L 61/2007* (2013.01); *H04L 69/22* (2013.01);
(Continued)

(58) Field of Classification Search
None
See application file for complete search history.

(56) References Cited

U.S. PATENT DOCUMENTS 6,941,338 B1 * 9/2005 Madsen .............. H04L 67/2819
709/203
2002/0176579 A1 11/2002 Deshpande et al.
(Continued)

FOREIGN PATENT DOCUMENTS

CN 1387643 A 12/2002
CN 1505316 A 6/2004
(Continued)

OTHER PUBLICATIONS

Chinese Office Action dated Nov. 3, 2017, issued in the Chinese Patent Application No. 201380058638.4.
(Continued)

*Primary Examiner* — Gregory B Sefcheck
*Assistant Examiner* — Suk Jin Kang
(74) *Attorney, Agent, or Firm* — Jefferson IP Law, LLP (57) ABSTRACT

A method and device for hosting an application by an access node which provides network access to a terminal in a mobile communication system are provided. The method includes receiving a request packet for a service request from a user application of a mobile terminal, delivering the request packet to an application included in the access node, if a destination of the request packet corresponds to the application of the access node, providing a service to the user application of the mobile terminal through the application, and delivering the request packet to a corresponding public application on an external network, if the application corresponding to the destination of the request packet does not exist in the access node.

18 Claims, 9 Drawing Sheets

(51) Int. Cl.

| | | |
|---|---|---|
| *H04L 29/12* | (2006.01) | |
| *H04L 29/06* | (2006.01) | |
| *H04W 48/08* | (2009.01) | |
| *H04W 88/08* | (2009.01) | |
| *H04L 29/08* | (2006.01) | |
| *H04W 84/04* | (2009.01) | |
| *H04W 88/02* | (2009.01) | |
| *H04L 12/741* | (2013.01) | |

(52) U.S. Cl.
CPC ............ *H04W 4/00* (2013.01); *H04W 4/60* (2018.02); *H04W 48/08* (2013.01); *H04L 67/2842* (2013.01); *H04W 84/042* (2013.01); *H04W 88/02* (2013.01); *H04W 88/08* (2013.01)

(56) References Cited

U.S. PATENT DOCUMENTS

| | | |
|---|---|---|
| 2004/0141502 A1 | 7/2004 | Corson et al. |
| 2005/0055442 A1 | 3/2005 | Reeves et al. |
| 2005/0102300 A1 | 5/2005 | Madsen |
| 2005/0125626 A1 | 6/2005 | Todd |
| 2005/0144172 A1 | 6/2005 | Kilian et al. |
| 2005/0183061 A1 | 8/2005 | Papanikolaou et al. |
| 2006/0203827 A1 | 9/2006 | Absillis |
| 2008/0101343 A1 | 5/2008 | Monette et al. |
| 2008/0153512 A1 | 6/2008 | Kale et al. |
| 2008/0270224 A1 | 10/2008 | Portman et al. |
| 2009/0044205 A1* | 2/2009 | Yoshimura .......... G06F 9/44536 719/328 |
| 2009/0158407 A1* | 6/2009 | Nicodemus ............ H04L 69/32 726/6 |
| 2009/0304009 A1 | 12/2009 | Kolhi et al. |
| 2010/0034089 A1 | 2/2010 | Kovvali et al. |
| 2010/0167760 A1 | 7/2010 | Kim |
| 2011/0125820 A1 | 5/2011 | Lin |
| 2011/0263275 A1 | 10/2011 | Kale et al. |
| 2012/0011067 A1* | 1/2012 | Katzin ............... G06Q 20/0855 705/44 |
| 2012/0099482 A1 | 4/2012 | Shook et al. |
| 2012/0129517 A1 | 5/2012 | Fox et al. |
| 2012/0327931 A1 | 12/2012 | Esteban et al. |
| 2013/0029708 A1 | 1/2013 | Fox et al. |
| 2013/0029719 A1 | 1/2013 | Choi et al. |
| 2013/0091452 A1 | 4/2013 | Sorden et al. |
| 2013/0104150 A1* | 4/2013 | Rdzak ..................... G06F 9/54 719/328 |
| 2013/0115872 A1 | 5/2013 | Huang et al. |
| 2013/0165084 A1 | 6/2013 | Xu et al. |
| 2013/0166623 A1 | 6/2013 | Stanwood et al. |
| 2013/0246564 A1 | 9/2013 | Lee et al. |
| 2013/0339250 A1* | 12/2013 | Katzin .................. G06Q 40/00 705/44 |
| 2014/0007048 A1 | 1/2014 | Qureshi et al. |
| 2014/0007183 A1 | 1/2014 | Qureshi et al. |
| 2014/0010161 A1 | 1/2014 | Jeong et al. |
| 2014/0153392 A1 | 6/2014 | Gell et al. |
| 2014/0153504 A1 | 6/2014 | Wang et al. |
| 2014/0155043 A1 | 6/2014 | Gell et al. |
| 2014/0274136 A1 | 9/2014 | Edge et al. |
| 2015/0024737 A1* | 1/2015 | Fox .................... H04W 12/1208 455/425 |
| 2015/0245264 A1 | 8/2015 | Xiong |
| 2016/0135016 A1 | 5/2016 | Zou |
| 2017/0085524 A1 | 3/2017 | Das et al. |
| 2017/0337095 A1* | 11/2017 | Rdzak ..................... G06F 9/54 |
| 2018/0089753 A1* | 3/2018 | Katzin ................ G06Q 20/027 |
| 2018/0323993 A1* | 11/2018 | Ansari ............... H04L 12/2803 |
| 2020/0274727 A1* | 8/2020 | Ansari ............. H04L 29/12132 |

FOREIGN PATENT DOCUMENTS

| | | |
|---|---|---|
| CN | 1716895 A | 1/2006 |
| KR | 10-2004-0056423 A | 7/2004 |
| KR | 10-0692653 B1 | 3/2007 |
| KR | 10-2011-0095770 A | 8/2011 |
| KR | 10-2011-0114820 A | 10/2011 |
| WO | 2011/129635 A2 | 10/2011 |
| WO | 2012/124904 A2 | 9/2012 |

OTHER PUBLICATIONS

Korean Intellectual Property Office Action dated Nov. 15, 2018, issued in Korean Application No. 10-2012-0126013.
Chinese Office Action dated Aug. 4, 2020, issued in Chinese Application No. 201910052524.8.
Chinese Office Action dated Mar. 19, 2021, issued in Chinese Application No. 201910052524.8.

* cited by examiner

METHOD AND DEVICE FOR HOSTING APPLICATION BY ACCESS NODE

CROSS-REFERENCE TO RELATED APPLICATION(S)

This application is a continuation application of prior application Ser. No. 14/441,356, filed on May 7, 2015, which is a U.S. National Stage application under 35 U.S.C. § 371 of an International application filed on Nov. 7, 2013 and assigned application number PCT/KR2013/010076, which claimed the benefit of a Korean patent application filed on Nov. 8, 2012 in the Korean Intellectual Property Office and assigned Serial number 10-2012-0126013, the entire disclosure of which is hereby incorporated by reference.

TECHNICAL FIELD

The present disclosure relates to a wireless communication system. More particularly, the present disclosure relates to a method and apparatus for hosting an application service by an access node in a wireless communication system.

BACKGROUND

With the rapidly increasing use of portable computing devices such as smartphones, tablet computers, and the like, various Internet application services have been provided over cellular mobile communication networks. In a cellular mobile communication system, a general access node that is in charge of a wireless connection with a mobile terminal, is configured to serve as a simple bit-pipe which upon receiving an Internet service request from the terminal, delivers the Internet service request to an Application Server (AS) of the Internet and delivers a response from the AS to the terminal.

Existing platforms as described above have difficulties in hosting various applications and providing application differentiation and different levels of Quality of Service (QoS). Moreover, for these existing platforms, it is not easy to add new additional services corresponding to changes in technologies and to use resources of an access network in providing various application services.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for hosting an application service by an access node in a wireless communication system.

Another aspect of the present disclosure is to provide a method and device for hosting applications by an access node in a cellular mobile communication network.

Another aspect of the present disclosure is to provide a method and device for hosting various applications and using information of an access network by an access node.

Another aspect of the present disclosure is to provide a method and device for filtering a service request of a user with a base station application when necessary.

Another aspect of the present disclosure is to provide a method and device for directly providing an Internet service by a base station to a terminal based on interworking between an access network and a base station application.

In accordance with an aspect of the present disclosure, a method for hosting an application by an access node which provides network access to a terminal in a mobile communication system is provided. The method includes receiving a request packet for a service request from a user application of a mobile terminal, delivering the request packet to an application included in the access node, if a destination of the request packet corresponds to the application of the access node, providing a service to the user application of the mobile terminal through the application, and delivering the request packet to a corresponding public application on an external network, if the application corresponding to the destination of the request packet does not exist in the access node.

In accordance with another aspect of the present disclosure, an access node device which provides network access to a terminal and provides application hosting in a mobile communication system is provided. The access node device includes a forwarding unit configured to identify a destination of a request packet, upon receiving the request packet for a service request from a user application of a mobile terminal, to deliver the request packet to an application included in the access node, if a destination of the request packet corresponds to the application of the access node, and to deliver the request packet to a corresponding public application on an external network, if the application corresponding to the destination of the request packet does not exist in the access node, and an application executing unit configured to provide a service to the user application of the mobile terminal through the application.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1 through 9, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

A Mobile Station (MS), a User Equipment (UE), a smartphone, or a mobile device such as a tablet computer having a communication module mounted thereon is configured to connect to the Internet over an access network of a cellular wireless communication system such as $3^{rd}$ Generation Partnership Project (3GPP) Long-Term Evolution (LTE).

Figure 1:
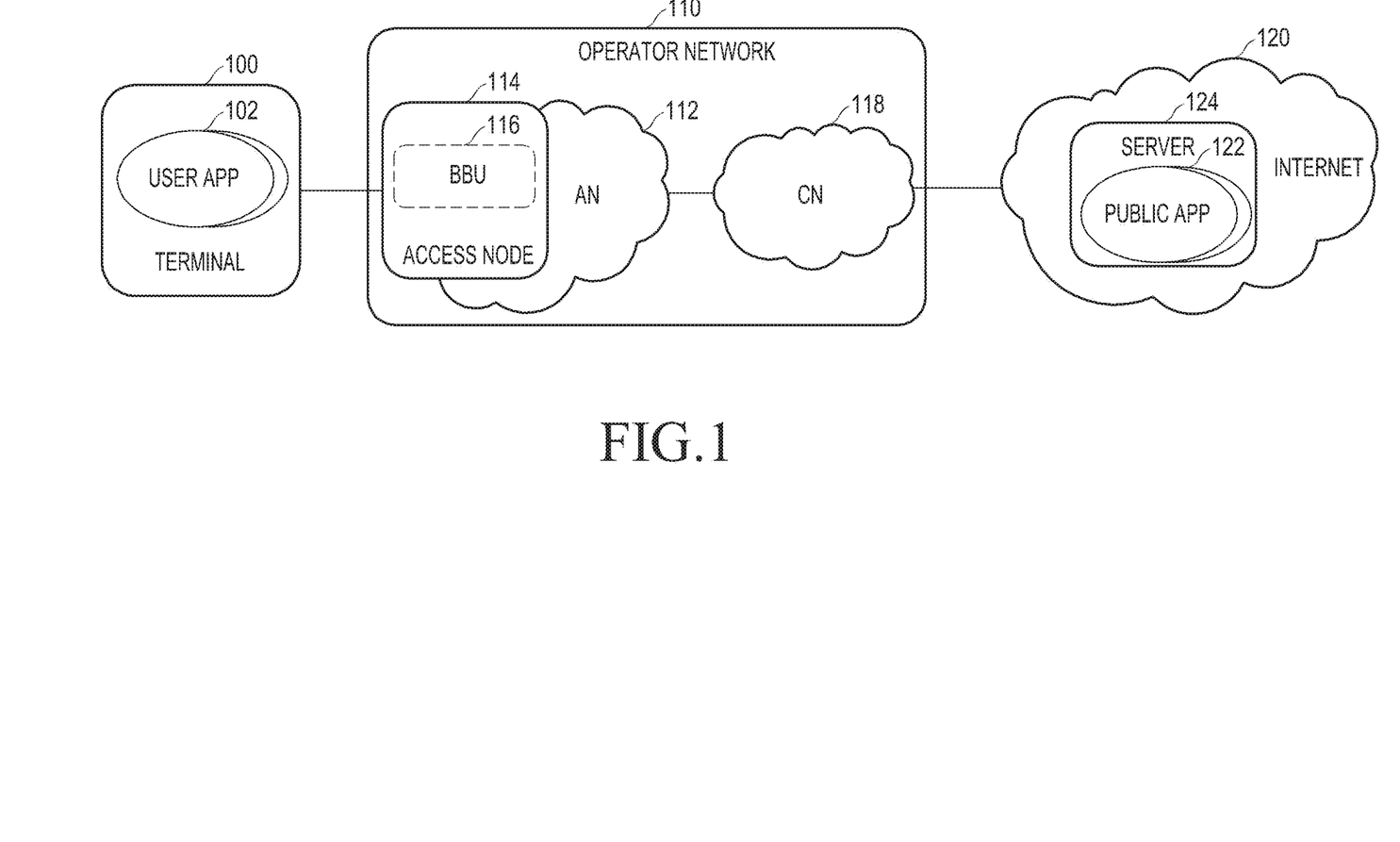
FIG. 1 schematically illustrates a structure of a system for providing an Internet service through an access network according to an embodiment of the present disclosure.

FIG. 1 schematically illustrates a structure of a system that provides an Internet Service over an access network according to an embodiment of the present disclosure.

Referring to FIG. 1, a system is illustrated, in which a mobile terminal 100 may include a communication module capable of cellular wireless communication, and may also include one or more applications 102 that need connection with an application 122 executed in an Application Server (AS) 124 on a public network 120 such as the Internet or another network that provides connection with a wireless network. Herein, for convenience of explanation, the application 102 executed on a mobile terminal will be referred to as a "User Application" and the application 122 executed on the Internet or the external another network (or the AS) 120 will be referred to as a "Public Application."

The mobile terminal 100 connects to the Internet or the external network 120 over an operator network 110 that includes an Access Network (AN) 112 and a Core Network (CN) 118. The AN 112 includes an access node 114, such as a Base Station (BS), a Node B, or an Evolved Node B (eNB), which provides a network access point for the mobile terminal 100, and includes at least one data service node that provide connection with the external network such as the Internet 120.

The access node 114 includes a BaseBand Unit (BBU) 116 that is in charge of data and signal processing for a mobile communication network. A service request from the user application 102 is delivered to the public application 122 of the Internet or external network 120 over the operator network 110, and the public application 122 then provides content or information to the mobile terminal 100 in response to the received service request. The AN 112 and the CN 118 of the operator network 110 process the service request and user traffic for the mobile terminal 100 according to a policy and a rule based on subscriber information.

Various embodiments of the present disclosure described below relate to directly providing an application-based service to a mobile terminal 100 by an access node 114 in an AN 112, in place of a service on the Internet or external network 120.

Figure 2:
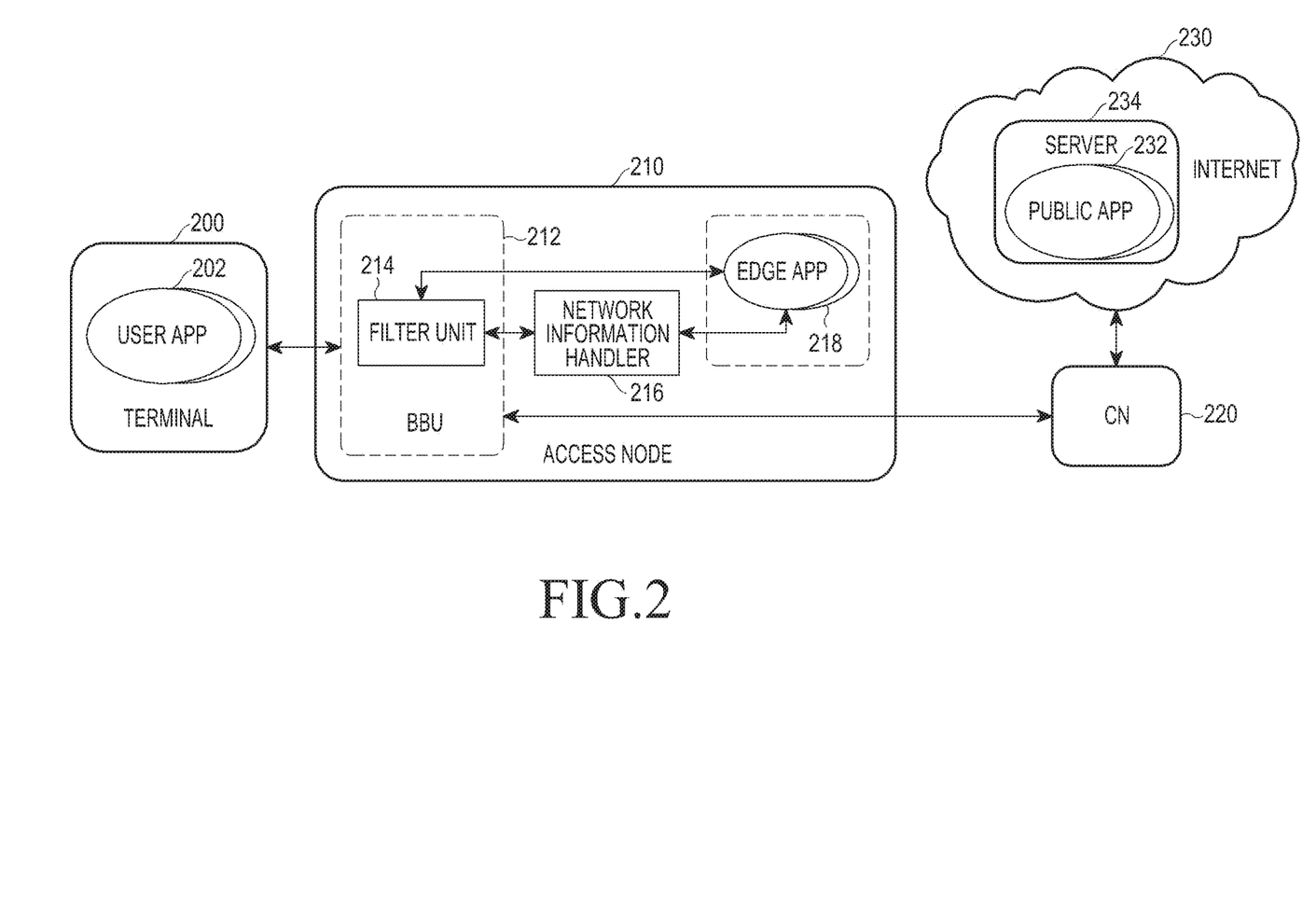
FIG. 2 schematically illustrates a structure of a system including a base station system according to an embodiment of the present disclosure.

FIG. 2 schematically illustrates a structure of a system including a BS system according to an embodiment of the present disclosure.

Referring to FIG. 2, a system is illustrated, in which a mobile terminal 200 that executes a user application 202 connects to an AN of an operator network through an access node 210 which connects to a pubic application 232 included in an AS 234 of the Internet or external network 230 through a CN 220. The access node 210 refers to a BS that provides connection to a mobile communication network to the mobile terminal 200, and may be a Node B in a 3G network and an eNB in an LTE network.

The AN 210 includes a BBU 212 that is in charge of general data and signal processing for a mobile communication network, and may also include a filter unit 214 for identifying and processing data of a particular application packet and a network information handler 216 for obtaining information about an AN (hereinafter, referred to as "access network information") when necessary. The access node 210 hosts an application 218 for a user service, and herein, the application 218 executed in the access node 210 will be referred to as an "Edge Application." The edge application 218 may provide a service to a user by using dynamically changing AN information, and, when necessary, may provide a service by interworking with the public application 232 of the Internet or external network 230 through a CN.

The user application 202 of the mobile terminal 200 sends a request for particular AN information to the access node 210 or sends a service request to the edge application 218 or the public application 232. If the user application 202 directly requests the AN information, a corresponding service request is filtered by the filter unit 214 of the BBU 212 and delivered to the network information handler 216 which then transmits the AN information to the user application 202 of the mobile terminal 200 in response to the service request. If the user application 202 of the mobile terminal 200 sends a service request to the edge application 218 or the particular public application 232, the service request is filtered by the filter unit 214 of the BBU 212 and delivered to the edge application 218 which then provides a service directly or using information or content from the public application 232, in response to the service request.

Various types of services may be provided through the edge application 218 hosted in the access node 210, and the following examples are of possible service scenarios.

In a first service scenario, a user application of a terminal sends a service request to an edge application of an access node, and the edge application directly delivers content or information to the mobile terminal in response to the received service request. This type of service may be used to serve local information such as a local weather or to provide traffic information of an AN to an authorized mobile terminal. This service causes no service traffic to a CN of an operator network, reducing the usage of backhaul.

In a second scenario, the user application sends a service request to the edge application which then handles the service process directly or through communication with the public application. In this case, the edge application may directly send a response to the service request to the user application, but when necessary, may communicate with the public application to obtain desired information or content. An example of this type of scenario is a real-time game, in which the edge application directly delivers information, which may be directly responded by the edge application, to the user without communicating with the public application, and obtains additional information, which is not included in the edge application, by communicating with the public application of the Internet or external network and provides a service to the user by using the obtained information.

In a third service scenario, the edge application operates transparently between the user application and the public application, and the user application is regarded as receiving a service by communicating with the public application, without noticing that the edge application exists between the user application and the public application. An example of this type of service is an edge cache operating transparently, in which the edge application operates as an edge cache to reduce a response time to a user request and a content transmission time.

Although the foregoing service scenarios have been described as examples herein, other types of services may also be provided through the edge application in other various embodiments of the present disclosure.

A detailed description will now be made of a structure of an access node associated with a service scenario in which a request for AN information and a service request are processed.

Figure 3:
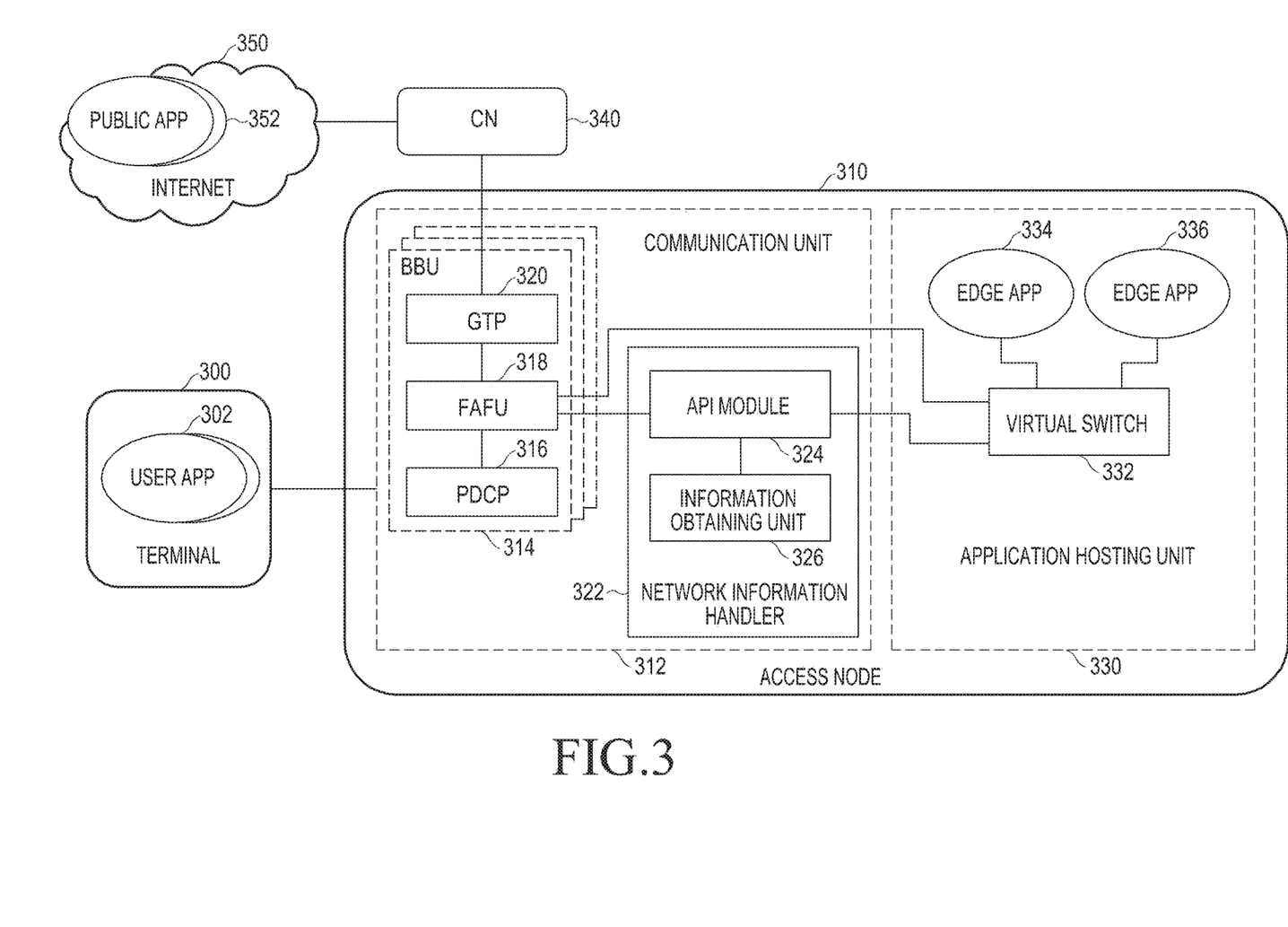
FIG. 3 illustrates a structure of an access node according to an embodiment of the present disclosure.

FIG. 3 illustrates a structure of an access node according to an embodiment of the present disclosure. Referring to FIG. 3, an example of an LTE BS is illustrated.

Referring to FIG. 3, a system is illustrated, in which a mobile terminal 300 that executes a user application 302 (or a user application execution block) connects to an AN of an operator network through an access node 310 which connects to a public application 352 on the Internet or external network 350 through a CN 340.

The access node 310 may include a communication unit 312 and an application hosting unit 330, in which the communication unit 312 may include a BBU 314 that is in charge of general data and signal processing for a mobile communication network and a network information handler 322 for managing information about an AN, and the application hosting unit 330 is configured to drive one or more edge applications (or edge application execution blocks) 334 and 336. Further, the application hosting unit 330 includes a virtual switch 332. Herein, a Packet Data Convergence Protocol (PDCP) processor 316 and a General Packet Radio Service (GPRS) Tunneling Protocol (GTP) processor 320 out of a protocol stack of the BBU 314 are illustrated, and lower layers of the PDCP processor 316, Radio Link Control (RLC), Medium Access Control (MAC), and Physical (PHY) are not illustrated for convenience of explanation.

The PDCP processor 316 is in charge of packet communication between the mobile terminal 300 and the access node 310, and processes conversion and interpretation of an Internet Protocol (IP) packet. The GTP processor 320 delivers IP packets from the PDCP processor 316 to the Internet or external network 350 through the CN 340, or delivers IP packets coming from the Internet or external network 350 to the PDCP processor 316 through the CN 340.

A Filter and Forwarding Unit (FAFU) 318 is logically located between the PDCP processor 316 and the GTP processor 320, and identifies IP packets transmitted or received among the mobile terminal 300, the edge applications 334 and 336, the public application 352, and an Application Program Interface (API) module 324 according to a predetermined rule to deliver the IP packets to corresponding destinations. More specifically, the FAFU 318 identifies a packet for a network information request and/or a service request delivered from the user application 302 according to a preset rule and delivers the packet to an entity that processes the corresponding request.

The packet for the network information request received from the user application 302 is delivered to the network information handler 322 by the FAFU 318, and the packet for the service request received from the user application 302 is delivered to the corresponding edge applications 334 and 336. Upon receiving a packet destined to the mobile terminal 300 from the public application 352 or the edge applications 334 and 336, the FAFU 318 delivers the packet to the mobile terminal 300 through the PDCP processor 316. The FAFU 318 delivers a particular packet delivered from the terminal or a particular packet delivered from the edge applications 334 and 336 to the API module 324 of the network information handler 322, and delivers a response packet delivered from the API module 324 to the mobile terminal 300 or the corresponding edge applications 334 and 336 through the PDCP processor 316.

Although the FAFU 318 has been described as an independent block that is logically located between the PDCP processor 316 and the GTP processor 320 herein, the FAFU 318 may also be implemented in the PDCP processor 316 or the GTP processor 320.

The network information handler 322 receives the network information request through an information obtaining unit 326 by the API module 324.

In an embodiment of the present disclosure, by using a destination IP address included in a header of a request packet including the network information request or the service request or a Universal Resource Locator (URL) included in the header of the request packet, the FAFU 318 may determine an entity for delivering the request packet. In an embodiment of the present disclosure, when the edge application 334 is configured in the access node 310, the destination IP address and the URL destined to the edge application 334 may be set as a filtering rule in the FAFU 318. Upon receiving the request packet including the destination IP address and/or the URL set as the filtering rule, the FAFU 318 delivers the request packet to the edge application 334 instead of to the CN 340.

The FAFU 318 and the edge applications 334 and 336 are connected through IP-in-IP tunneling or Inter-Process Communication (IPC). Similarly, packet delivery between the FAFU 318 and the API module 324 of the network information handler 322 may be performed through the IP-in-IP tunneling or the IPC.

Upon receiving the request packet regarding the network information, the API module 324 of the network information handler 322 identifies the request packet and delivers the request packet to the information obtaining unit 326. The information obtaining unit 326 collects information about the access node 310 from the BBU 314 of the access node 310, an Operation and Maintenance (OAM) unit, or another function block or periodically or aperiodically collects network information about an AN, and stores and manages the collected information or network information, and configures desired network information at the request of the API module 324 and delivers the configured network information to the API module 324. Examples of network information managed by the information obtaining unit 326 may include a BS identifier (ID) (or a cell ID), a BS load (a cell load or a capacity indicator), a Resource Block (RB) usage, a BandWidth (BW) usage, channel information of an access subscriber, and the like.

The API module 324 configures the network information obtained from the information obtaining unit 326 in an IP packet format and transmits the configured network information to the user application 302. More specifically, the IP-packetized network information is delivered from the API module 324 to the FAFU 318 of the BBU 314, and then is transmitted to the corresponding user application 302 through a corresponding protocol stack of the BBU 314. The at least one edge applications 334 and 336 may transmit a request packet regarding AN information to the API module 324 which obtains the requested network information from the information obtaining unit 326 and transmits the obtained network information to the corresponding edge applications 334 and 336.

The API module 324 provides an interface for delivery of a request and a response in association with network information between the user application 302 and the edge applications 334 and 336, such that information of the access node 310 is inquired and provided to the mobile terminal 300 or the edge applications 334 and 336. The interface between the API module 324 and the edge applications 334 and 336 may be implemented, for example, as a web API such as Representational State Transfer (REST), and may also be implemented in other forms such as a Software Development Kit (SDK), a library, or the like.

The edge applications 334 and 336 hosted in the access node 310 are executable on a general Information Technology (IT) server, and may be executed on one Operating System (OS), or may be executed on one or multiple virtual machines if the access node 310 is logically separated into several virtual machines. The edge applications 334 and 336 illustrated in FIG. 3 are hosted on one virtual machine, and are connected to the BBU 314 through the virtual switch 332.

Figure 4:
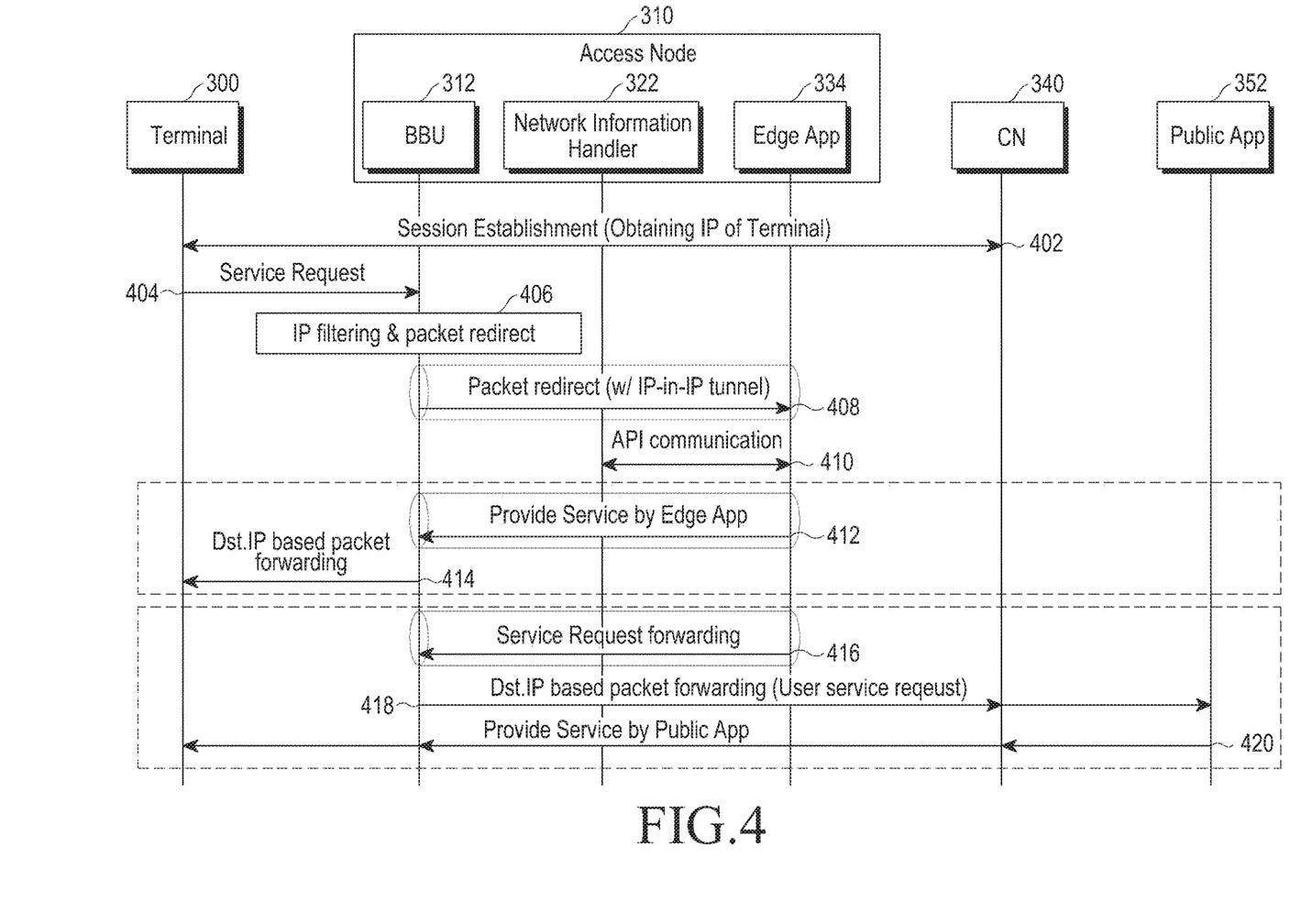
FIG. 4 illustrates a call flow of a scenario where a terminal receives a service from an edge application or a public application according to an embodiment of the present disclosure.
Figure 5:
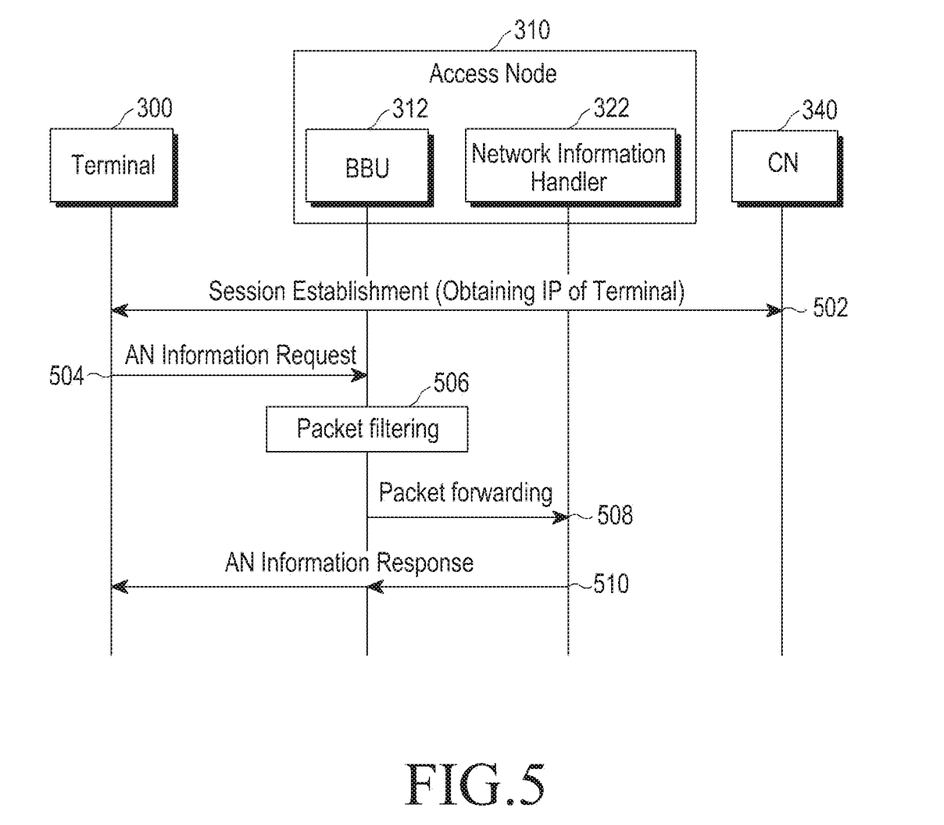
FIG. 5 illustrates a call flow of a scenario where a terminal receives access network information according to an embodiment of the present disclosure.

With reference to call flows illustrated in FIGS. 4 and 5, the following description is of service scenarios in which an application service request and an AN information request for a terminal are processed.

FIG. 4 illustrates a call flow of a scenario where a terminal receives a service from an edge application or a public application according to an embodiment of the present disclosure.

Referring to FIG. 4, a call flow is illustrated, such that in operation 402, a session is established between a mobile terminal 300 and a packet data node (not shown) of a CN 340, which then allocates an IP address to the mobile terminal 300 through the session establishment.

In operation 404, the mobile terminal 300 transmits a request packet for a service request generated by the user application 302, as illustrated in FIG. 3, to an access node 310. The service request generated by the user application 302 of the mobile terminal 300 may be configured in a format that is similar to, for example, a general Hyper Text Transfer Protocol (HTTP) web content request.

The request packet transmitted from the mobile terminal 300 is filtered by the FAFU 318, as illustrated in FIG. 3, of a BBU 312 of the access node 310 according to a predetermined rule in operation 406, and is transmitted to a corresponding edge application identified by the filtering in operation 408. In an embodiment, the filtering may be performed based on a destination IP address included in a header of the request packet. That is, upon receiving the request packet having a preset destination IP address, the FAFU 318 delivers the request packet to a corresponding edge application. In another embodiment, the FAFU 318 may perform filtering by using a destination URL included in a header of the request packet. In operation 408, the filtered request packet is transmitted to a corresponding edge application 334 through IP-in-IP tunneling.

In operation 410, the edge application 334 sends a request for preset available network information to the network information handler 322 in response to the service request of the request packet and receives the network information through API communication with the network information handler 322. In an embodiment, communication for delivering a network information request and a request result between the edge application 334 and the network information handler 322 is performed through an interface in the form of a web API or SDK.

In operations 412 and 414, the edge application 334 provides the network information corresponding to the request packet to the mobile terminal 300 through the BBU 312. For example, the network information may be configured with one or more IP packets. If necessary, the edge application 334 may send a request for information or content needed for the mobile terminal 300 to provide a desired service to a public application 352 and obtain the information or content.

If the edge application 334 cannot accept the service request of the request packet, that is, does not provide a service requested by the mobile terminal 300, the edge application 334 forwards the request packet to the FAFU 318 of the BBU 312 in operation 416.

The FAFU 318 of the BBU 312 transmits the request packet to the corresponding public application 352 of the Internet 350 through the CN 340 in operation 418, and the public application 352 provides the requested service to the mobile terminal 300 through the CN 340 and the BBU 312 of the access node in operation 420. If the edge application 334 provides a caching service for the public application 352 in an embodiment of a detailed service, service content from the public application 352 is cached (that is, stored) in the edge application 334 which then provides the service content to the mobile terminal 300.

FIG. 5 illustrates a call flow of a scenario where a terminal receives access network information according to an embodiment of the present disclosure.

Referring to FIG. 5, a call flow is illustrated, such that in operation 502, a session is established between a mobile terminal 300 and a packet data node (not shown) of a CN 340, and the CN 340 allocates an IP address to the mobile terminal 300 through the session establishment.

In operation 504, the mobile terminal 300 transmits a request packet for requesting AN information generated by the user application 302, as illustrated in FIG. 3, to an access node 310. The request for the AN information may be configured in a format that is similar to, for example, a general HTTP web content request.

The request packet of the mobile terminal 300 is filtered by the FAFU 318, as illustrated in FIG. 3, of a BBU 312 of the access node 310 according to a predetermined rule in operation 506, and is delivered by the filtering to a network information handler 322 in operation 508. In an embodiment, if the destination IP address or destination URL included in the header of the request packet is an IP address or URL predetermined for a network information request, the FAFU 318 delivers the request packet to the network information handler 322 instead of to the CN 340. Communication for delivering a network information request and a request result between the user application 302 of the mobile terminal 300 and the network information handler 322 is performed through an open interface, such as a web API like REST, or SDK.

In operation 510, the network information handler 322 provides network information to the user application 302 of the mobile terminal 300 through the BBU 312. For example, the network information may include at least one of a weather of a region where an AN is located, a load of an AN and/or an access node, a backhaul bandwidth, and location information at the request of the mobile terminal 300, and may be configured with one or more IP packets.

Figure 6:
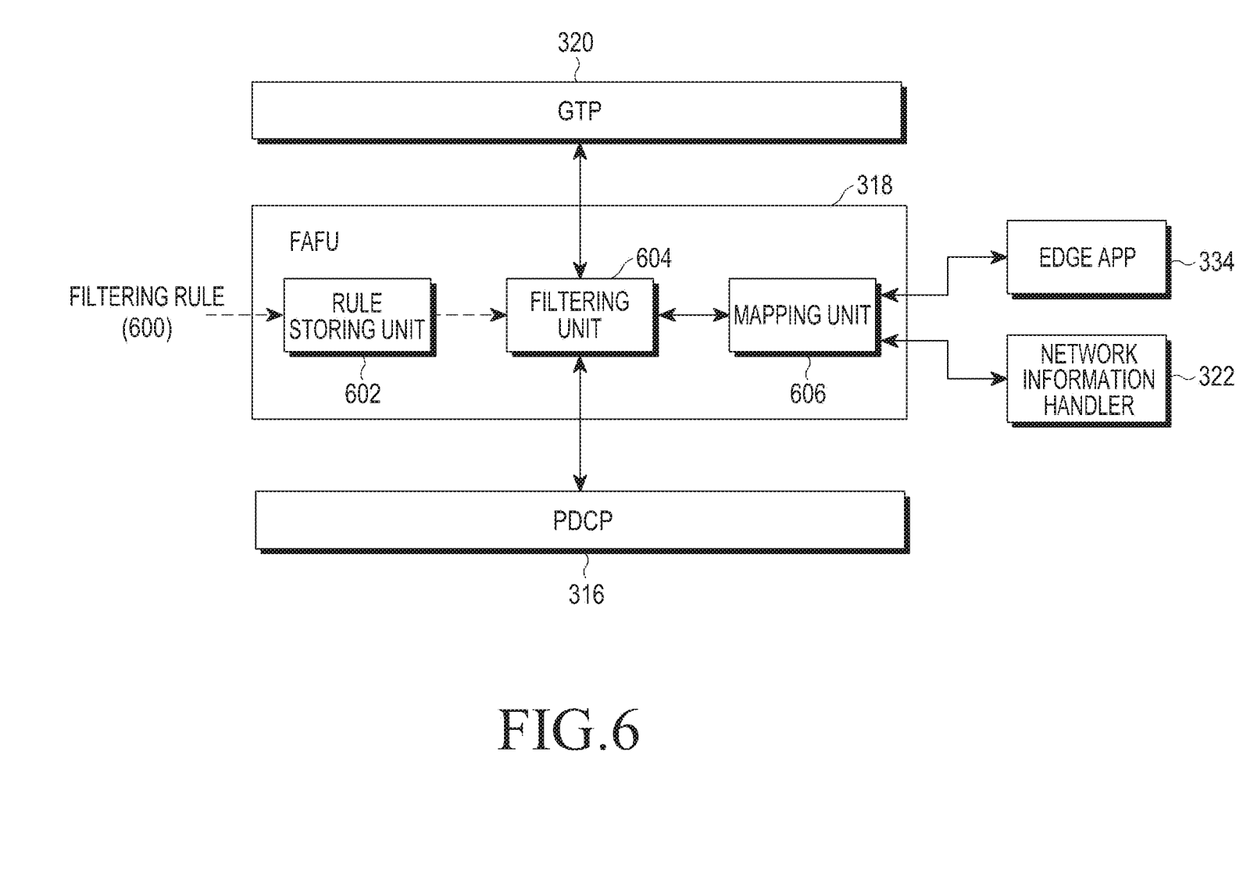
FIG. 6 illustrates a detailed structure of a filtering and forwarding unit according to an embodiment of the present disclosure.

FIG. 6 illustrates a detailed structure of a FAFU according to an embodiment of the present disclosure.

Referring to FIG. 6, a FAFU 318 is illustrated, where the FAFU 318 is located between a GTP processor 320 and a PDCP processor 316 and may include a rule storing unit 602, a filtering unit 604, and a mapping unit 606.

A filtering rule 600 includes a 5-tuple of an IP, that is, a source IP address, a source port number, a destination IP address, a destination port number, and a protocol type, and may be directly input by a BS operator through a command line or may be set by a system manager (not shown) of an operator network. A system manager is a management node that provides an interface having an operator-matching function to allow the operator to perform an operation and maintenance with respect to an access node, and also provides software management, configuration management, performance management, and failure management.

Each filtering rule corresponds to each edge application and may be set/changed/deleted when each edge application is installed/updated/deleted in or from the access node. The system manager obtains information about a corresponding filtering rule when an edge application is installed in an access node, and delivers the information to the FAFU 318, which then stores the filtering rule corresponding to the information in the rule storing unit 602 and generates the filtering rule and a tuple with a corresponding edge application.

The filtering unit 604 filters packets received from the GTP processor 320, the PDCP processor 316, an edge application 334, or a network information handler 322 according to the filtering rule stored in the rule storing unit 602, and the mapping unit 606 determines a corresponding destination according to the filtering and transmits the packets to an entity that is the determined destination. An example of packet filtering based on a destination is as described below.

For example, a DownLink (DL) packet received through the GTP processor 320 may be transmitted directly to the PDCP processor 316 or delivered to the corresponding edge application 334 through the mapping unit 606. In another example, an UpLink (UL) packet received through the PDCP processor 316 may be transmitted directly to the GTP processor 320 or delivered to the corresponding edge application 334 or the network information handler 322 through the mapping unit 606. In another example, the packet received from the edge application 334 may be transmitted to the GTP processor 320 or delivered to the PDCP processor 316. In another example, the packet received from the network information handler 322 may be transmitted to the PDCP processor 316 or delivered to the corresponding edge application 334.

The mapping unit 606 determines a tuple corresponding to the edge application 334 when packets are delivered to the edge application 334 from the FAFU 318, and determines whether to deliver packets received from the edge application 334 to the PDCP processor 316 or the GTP processor 320, based on a tuple of the received packets. To this end, the mapping unit 606 may use at least one of a bearer ID of a radio bearer used in packet delivery between an access node and a mobile terminal, a Tunneling Endpoint ID (TEID) used for GTP tunneling, a source P address/port number, a destination IP address/port number, and IP information for tunneling.

Figure 7:
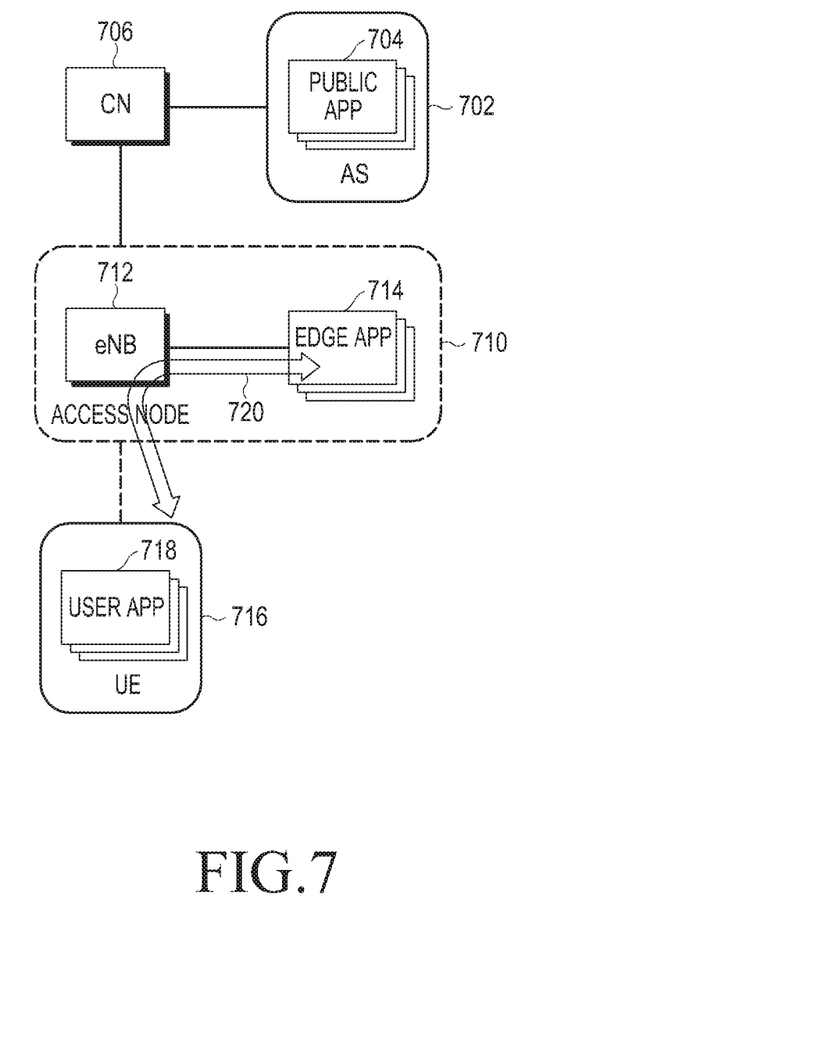
FIGS. 7, 8 and 9 illustrate operations corresponding to service scenarios according to various embodiments of the present disclosure.
Figure 8:
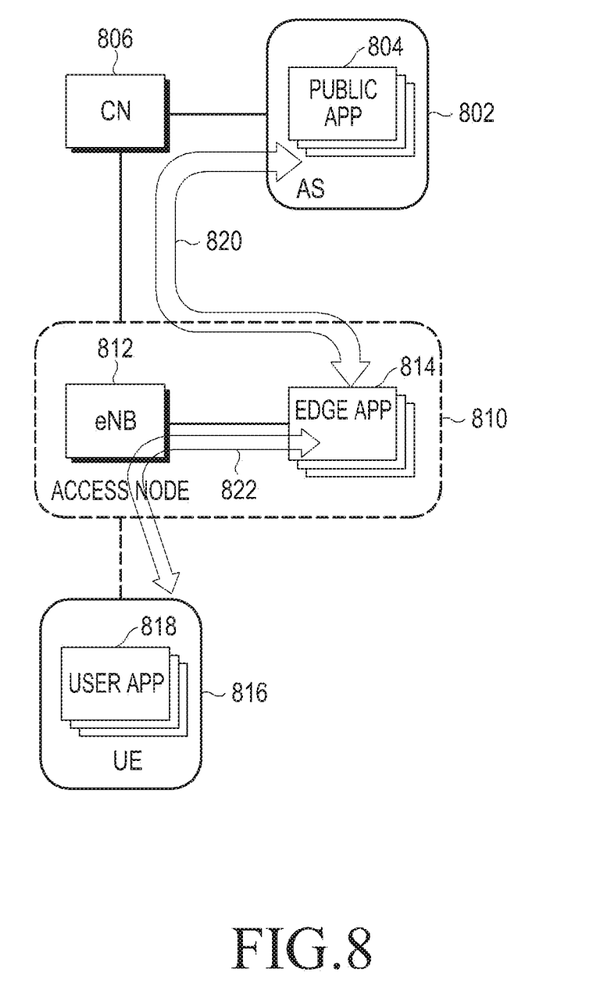
Figure 9:
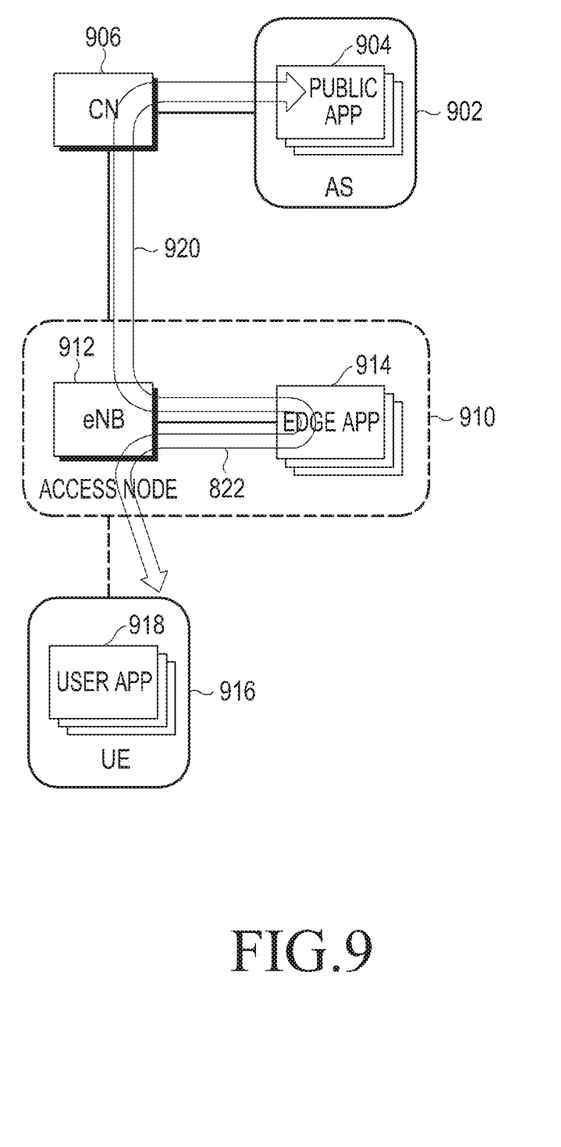

FIGS. 7 through 9 illustrate operations corresponding to service scenarios according to various embodiments of the present disclosure.

Referring to FIG. 7, a system is illustrated, in which a public application 704 is installed in an AS 702 located on the Internet or an external network. A UE 716 includes a user application 718, and connects to an access node 710 by using a wireless access technique. The access node 710 includes an eNB block 712 configured with a modified existing BS platform and an edge application 714 according to an embodiment of the present disclosure, and may connect to the public application 704 of the AS 702 through a CN 706. The eNB block 712 includes a protocol stack according to an existing BS platform, for example, PHY, MAC, RLC, PDCP, GTP, and the like, and may also include an FAFU according to an embodiment of the present disclosure. The CN 706 may be configured, for example, with an Evolved Packet Core (EPC) of an LTE system.

The user application 718 directly connects to a particular edge application 714 of the access node 710, which is associated with a desired service, for example, a local weather or an advertisement, and receives content or information regarding the desired service from the edge application 714, as indicated by 720. Access information regarding the edge application 714, for example, a destination IP address or a destination URL may be provided to a user through an offline advertisement leaflet, a Television (TV), a medium, or the like, and the user may directly input the destination IP address or the destination URL by using an input means of the UE 716.

In another embodiment, the access node 710 provides prior information (such as an advertisement or the like) regarding a service that can be provided through the edge application 714, to the UE 716 through a radio channel, and the UE 716 displays a soft button or a menu key through which the edge application 714 may be connected, on a display screen, and senses selection (a touch) of the soft button or the menu key from the user, thus triggering a service request for the edge application 714. In another embodiment, a particular application installed in the user or the UE may request and obtain access information regarding the edge application 704 by using a preset IP address or URL, and the user may send a service request to the edge application by using the obtained access information.

Referring to FIG. 8, a system is illustrated, in which a public application 804 is installed in an AS 802 located on the Internet or an external network. A UE 816 includes a user application 818 and connects to an access node 810 by using a wireless access technique. The access node 810 includes an eNB block 812 configured with a modified existing BS platform and an edge application 814 according to an embodiment of the present disclosure, and may connect to a public application 804 of the AS 802 through a CN 806.

If the user application 818 sends a service request for a desired service, for example, real-time gaming or online editing to the access node 810 and the access node 810 includes the edge application 814 capable of processing the service request, then the access node 810 filters the service request and delivers the service request to the edge application 814. The edge application 814 provides content or information regarding the desired service to the user application 818 according to the service request, as indicated by 822. When necessary, the edge application 814 may connect to the public application 804 to request and receive additional information necessary for providing the service, as indicated by 820.

Referring to FIG. 9, a system is illustrated, in which a public application 904 is installed in an AS 902 located on the Internet or an external network. A UE 916 includes a user application 918 and connects to an access node 910 by using a wireless access technique. The access node 910 includes an eNB block 912 configured with a modified existing BS platform and an edge application 914 according to an embodiment of the present disclosure, and may connect to a public application 904 of the AS 902 through a CN 906.

For example, if the edge application 914 provides a transparent caching service, the user application 918 sends a service request for desired content to the access node 910 which then filters the service request, instead of delivering the service request to the public application 904, to deliver the service request to the edge application 914. If the edge application 914 has not stored therein, the desired content corresponding to the service request, the edge application 914 sends the service request for the content to the public application 904, as indicated by 920, receives the content from the public application 904 through the CN 906 and stores (caches) the content, and provides the stored content to the user application 918, as indicated by 822. If the edge application 914 has stored the content therein, the edge application 914 may directly provide the stored content to the user application 918 without accessing the public application 904.

According to various embodiments of the present disclosure operating as described above, AN information such as a BS load, a backhaul bandwidth, location information, or the like is provided to a mobile terminal, thereby identifying an application service based on the AN information and easily supporting different levels of Quality of Service (QoS). Moreover, various embodiments of the present disclosure facilitate addition of value-added services or expansion to the value-added services, along with advances in characteristics and techniques of mobile communication networks.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

What is claimed is:
1. A method for hosting an edge application executed by an edge application server which provides an application-based service to a user equipment (UE), the method comprising:
  receiving, from an application client of the UE, a request packet requesting an application-based service;
  delivering the request packet to the edge application executed by the edge application server;
  receiving network information associated with the application-based service by using a first application program interface (API) associated with the application-based service;
  transmitting, to the application client, the network information by using a second API;
  identifying whether additional information related to the application-based service is necessary for the edge application to provide the application-based service corresponding to the request packet;
  transmitting a request for the additional information related to the application-based service to a public application after receiving the request packet;
  obtaining the additional information from the public application in response to the request; and
  transmitting, to the application client, the application-based service by using the edge application and the additional information obtained from the public application.

2. The method of claim 1, wherein the network information associated with the application-based service comprises at least one of:
weather information of a region where the edge application server is located, a traffic load of the edge application server, an access network to which the edge application server belongs, a backhaul bandwidth of the access network, or location information related to the edge application server.

3. The method of claim 1,
wherein the request packet is delivered using a web API or software development kit (SDK) to the edge application through a network information handler included in the edge application server, and
wherein the network information handler is configured to collect manage information of an access network to which the edge application server belongs.

4. The method of claim 1, further comprising:
identifying whether the request packet includes destination information corresponding to the edge application executed in the edge application server; and
delivering the request packet to the edge application executed in the edge application server, if the request packet includes the destination information corresponding to the edge application executed in the edge application server, wherein the destination information is included in a header of the request packet.

5. The method of claim 4, wherein the destination information includes at least one of internet protocol (IP) address or a universal resource locator (URL).

6. The method of claim 1, wherein the transmitting of the application-based service comprises:
providing a cache service of a public application through the edge application executed in the edge application server, and the public application is executed in Internet or an external network.

7. The method of claim 1, further comprising:
delivering the request packet to a core network, if the request packet does not include destination information corresponding to the edge application executed in the edge application server.

8. The method of claim 1, wherein the transmitting of the application-based service comprises:
if the edge application can provide the application-based service, by the edge application, providing the the application-based service to the application client of the UE.

9. The method of claim 1, wherein the transmitting of the application-based service comprises:
if the edge application cannot provide the application-based service, by the edge application, delivering the request packet to a core network.

10. An edge application server which provides an application-based service to a user equipment (UE), the edge application server comprising:
a transceiver; and
at least one processor configured to:
control the transceiver to receive, from an application client of the UE, a request packet requesting an application-based service,
control the transceiver to deliver the request packet to the edge application executed by the edge application server,
control the transceiver to receive network information associated with the application-based service by using a first application program interface (API) associated with the application-based service,
control the transceiver to transmit, to the application client, the network information by using a second API,
identify whether additional information related to the application-based service is necessary for the edge application to provide the application-based service corresponding to the request packet,
control the transceiver to transmit a request for the additional information related to the application-based service to a public application after receiving the request packet,
obtain the additional information from the public application in response to the request, and
control the transceiver to transmit, to the application client, the application-based service by using the edge application and the additional information obtained from the public application.

11. The edge application server of claim 10, wherein the network information associated with the application-based service comprises at least one of:
weather information of a region where the edge application server is located, a traffic load of the edge application server, an access network to which the edge application server belongs, a backhaul bandwidth of the access network, or location information related to the edge application server.

12. The edge application server of claim 10,
wherein the request packet is delivered using a web API or software development kit (SDK) to the edge application through a network information handler included in the edge application server, and
wherein the network information handler is configured to collect manage information of an access network to which the edge application server belongs.

13. The edge application server of claim 10, wherein the at least one processor is further configured to:
identify whether the request packet includes destination information corresponding to the edge application executed in the edge application server, and
deliver the request packet to the edge application executed in the edge application server, if the request packet includes the destination information corresponding to the edge application executed in the edge application server, wherein the destination information is included in a header of the request packet.

14. The edge application server of claim 13, wherein the destination information includes at least one of internet protocol (IP) address or a universal resource locator (URL).

15. The edge application server of claim 10, wherein the at least one processor is further configured to:
provide a cache service of a public application through the edge application executed in the edge application server, and the public application is executed in Internet or an external network.

16. The edge application server of claim 10, wherein the at least one processor is further configured to:
deliver the request packet to a core network, if the request packet does not include destination information corresponding to the edge application executed in the edge application server.

17. The edge application server of claim 10, wherein the at least one processor is further configured to:
if the edge application can provide the application-based service, by the edge application, provide the application-based service to the application client of the UE.

18. The edge application server of claim 10, wherein the at least one processor is further configured to:

if the edge application cannot provide the application-based service, by the edge application, deliver the request packet to a core network.

* * * * *